United States Patent [19]
Lavarenne

[11] 3,731,147
[45] May 1, 1973

[54] DEVICE FOR MEASURING THE ACCELERATION OF A VEHICLE

[75] Inventor: Jean Lavarenne, Villecresnes, France

[73] Assignee: Societe Nationale Industrielle Aerospatiale, Paris, France

[22] Filed: May 21, 1971

[21] Appl. No.: 145,835

[30] Foreign Application Priority Data

May 27, 1970 France....................7019444

[52] U.S. Cl. ...........................................317/5
[51] Int. Cl. .............................................H02p
[58] Field of Search..................................317/5

[56] References Cited

UNITED STATES PATENTS

| | | | |
|---|---|---|---|
| 2,619,402 | 11/1952 | McCutheon | 317/5 |
| 3,268,725 | 8/1966 | Auer, Jr. et al. | 317/5 |
| 3,283,146 | 11/1966 | Berti | 317/5 |

Primary Examiner—L. T. Hix
Attorney—Karl W. Flocks

[57] ABSTRACT

A ground device for measuring the acceleration of a vehicle on a speed basis in which at least three primary switches operate by three sensors, time-delayed relays being adjusted to be effective in causing stepped triggering of a number of storage flip-flop contacts whereby to store a first classification of a first average speed and a second speed classification of a second average speed, a certain chosen difference between said second and first average speeds producing an output signal if its detection occurs before transiting of the vehicle beyond said speed basis resets the storage flip-flops in their neutral state.

5 Claims, 1 Drawing Figure

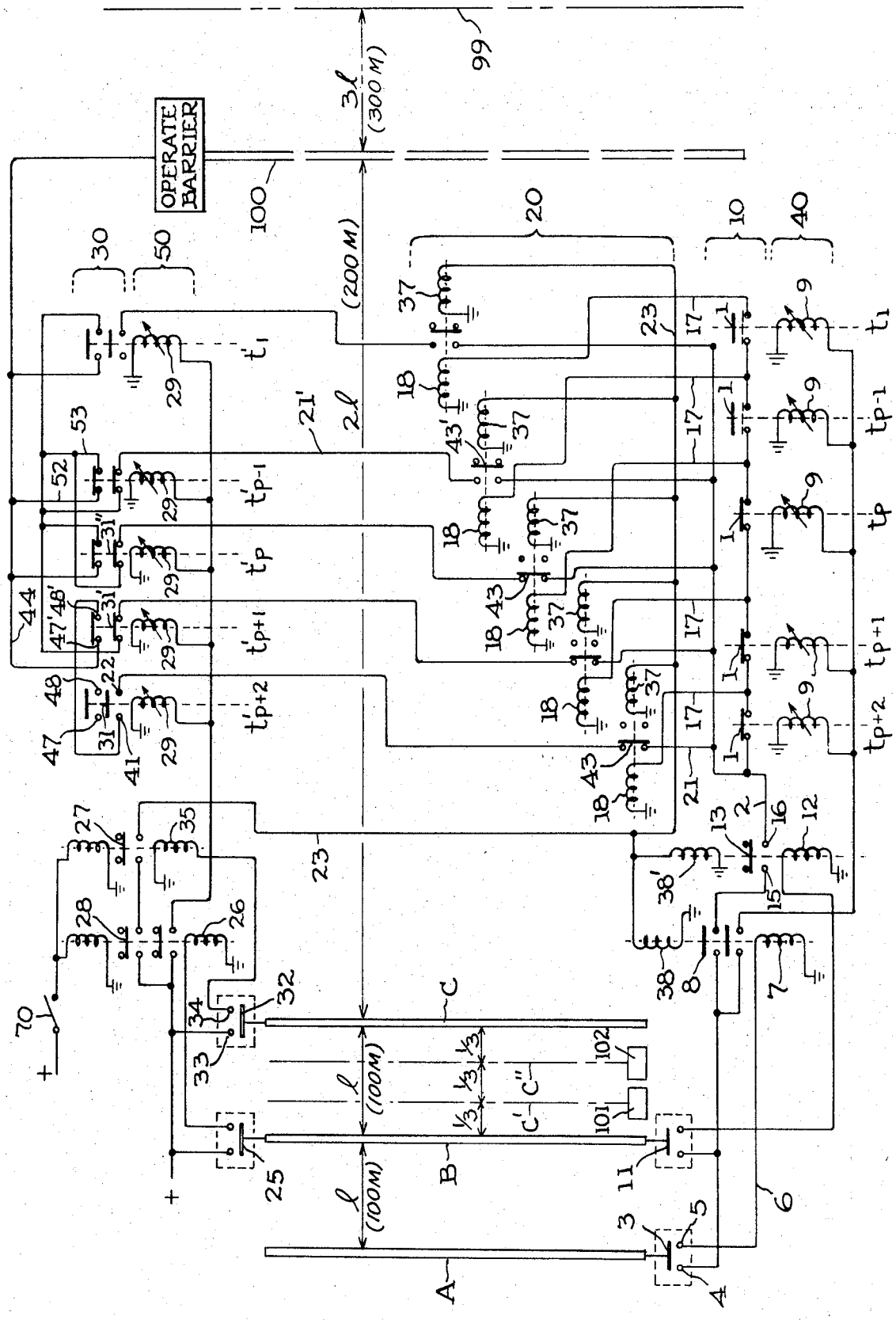

DEVICE FOR MEASURING THE ACCELERATION OF A VEHICLE

The present invention relates to an apparatus for measuring the acceleration of a vehicle, and more particularly to a stationary equipment not carried aboard the vehicle and by means of which the memorization of an initial classification, within a certain speed range, of the average speed of an aircraft rolling on the ground between first and second reference points, permits, by subsequent classification of the average speed of the aircraft as measured between the second and a third reference points, of instantly supplying a command signal used, for example, for raising a safety barrier across the path of an aircraft in difficulty in order to bring the same to a stop without damage in a gradually retarding arrester net within the safety limits of the runway. It is already known, at the pilot's request, to control by human action, from a monitoring station, a runway termination barrier enabling an aircraft in difficulty to be restrained in complete safety. Attempts have been made to automatically raise the barrier in good time by means of photoelectric cells, but a disadvantage of such cells is that they can be energized accidentally.

The present invention accordingly provides a device for measuring the acceleration of an aircraft while it is rolling along the ground close to the end of the runway, which device automatically activates the runway termination barrier only if an aircraft is in difficulty, that is to say decelerating, provision being made to prevent unwanted operation of the device in the particular case of an aircraft having elected to initiate a take-off at the end of the runway.

The invention further relates to:

apparatus for measuring the acceleration of a moving object by memorizing the classification of the first average speed and triggering an instantaneous command signal, immediately upon classification of the second average speed, in dependency upon a predetermined difference therebetween defining a minimum acceleration value;

measuring apparatus of the above kind in which the storage means are ordinary electronic flip-flops and therefore inexpensive and very reliable;

measuring apparatus in which operation is assured even in the event of failure of a command circuit by means of a standby circuit which is integral with each contractor already normally activated in service and which simultaneously takes over from the failed circuit and accordingly dispels any ambiguity;

acceleration measuring apparatus providing the ability to adjust the speed classification envelopes by means of precision time-delay relays which are simple and consequently reliable components;

apparatus for measuring an acceleration level selected at will by appropriately switching in the conductor lines connecting the initial speed classification storing flip-flop contactors to the command contactors of the second speed classifying system; and apparatus for measuring the acceleration of a vehicle between a first reference point and a third reference point at which the memories are cleared into the neutral zero state automatically by the contact that operates as the vehicle travels past the third reference point.

The description which follows with reference to the accompanying non-limitative exemplary drawings will give a clear understanding of how the invention can be carried into practice.

In the drawing the FIGURE is a circuit diagram of an acceleration measuring apparatus according to this invention.

Reference is first had to the FIGURE for a circuit diagram of an apparatus according to the invention that includes a series of first contactors 10, a series of storage elements 20, a series of combined command signal and redundancy contactors 30, and two sets 40 and 50 of time-delay relays.

In accordance with conventional practice, the diagram of the FIGURE is established for the resting state.

The acceleration of an object moving along the path AC is measured by two devices 10 and 30 for classing first and second average speeds respectively, that operate on similar principles.

Visible at 10 is a number of series-connected contactors 1 along the line 2. Consider now the case of an aircraft (not shown) about to cover the path AB: as its wheels run past reference point, means such as an inlaid pneumatic line similar to those used for counting purposes in traffic control systems closes an instantaneous contact 3 across two terminals 4 and 5 which then connect the energized line 6 to an electromagnet 7 that closes a two-pole contact 8.

The current is supplied by this contact 8 to a succession of parallel-connected precision time-delay relays 9 which are energized simultaneously and each of which is so adjusted in relation to the next one that if one were to adopt, as the time of origin $t_o$, the instant when contact 3 is closed (the flow of current simultaneously triggering the start of operation of all the time-delay relays in the set 40), opening of each corresponding contactor 1 should occur at the instants $t_1, t_2, t_3 \ldots t_n$ corresponding, say, to speeds of 100 meters per second, 99 meters per second, 98 meters per second, and so on.

As the aircraft comes level with point B at the instant $t_{AB}$, an instantaneous contact 11 closes, by means of a solenoid 12, a contact 13 across terminals 15 and 16. Since at the instant $t_{AB}$ a certain number of instants $t_1, t_2 \ldots$ will have elapsed, some of the contacts 1 will have opened the line 2 to which contact 13 applies the current from the supply line 6 via terminals 15 and 16. The parallel lines 17 will thus be the seat of current which energizes the solenoids 18 of the set of memories or storage elements 20.

Some lines energize terminals 22 at the level of the set of command contactors 30.

As the wheel of the aircraft run over the sensor of reference point, and at the very instant $t_{AB}$ when instantaneous contactor 11 energizes solenoid 12, an instantaneous contactor 25 energizes solenoid 26 which closes double contactor 28. Current is accordingly applied, at this instant $t_{AB}$ which is the origin $t'_o$ of the times for the second speed measurement between B and C, to the parallel-connected time-delay relays 29 of the set 50, which set is similar to the set 40 and functions in the same manner. At the instant $t_{AC}$ a certain number of relays 29 will have operated at the instants $t'_1, t'_2$, etc. before the aircraft wheels actuate instantaneous contactor 32 as they run past the point C. At this instant $t_{AC}$ the contactor 32 interconnects terminals 33 and 34 and the energized solenoid 35 closes the zeroing contact 27 to energize line 23. Line 23 energizes the solenoids of storage flip-flops 37 and the solenoids 38 and 38' whereby to revert the electric circuit to the resting configuration (except for contactors 27 and 28 and sets 30 and 50, which revert to that configuration only through closure of switch 70, it being possible for the latter to be governed by the $t'_n$ time-delay relay 29 for example).

As shown some the contactors 29 are depicted at an instant included between $t'_{p+1}$ and $t'_{p+2}$ before closure of contactor 27 and hence before the storage contacts such as 43 have been zeroed in the resting state 43'. It may so be seen that contactor 31 connects terminals 22 and 41 on line 21, which line is supplied with current by storage contactor 43 when it is closed. Thus a command signal for raising of the safety arresting barrier 100 is emitted by the line 44 as early as the instant $t'_p$.

For it may be seen that time-delay relay 9, provided for the instant $t_p$ in the set 10, not having yet operated at the instant $t_{AB}$ and the contact 43 being therefore closed in the corresponding memory, if time-delay relay 29 corresponding to $t'_p$ in the set 50 has operated, then the average speed over the section BC is identified as being less than the speed identified for section AB (the precision of the classifications being obviously dependent on the way in which the successive time-delays are stepped), making it necessary for the arrester barrier to be raised: operation of the time-delay relay corresponding to $t'_p$ suffices for the command to be passed.

In the exemplary situation shown, contact 31 has also closed, this being obtained at the instant $t'_{p+1}$, which is before closure of contact 27: the speed over BC is therefore doubly identified as being below the speed over AB, but in addition the value of $(V_{AB} - V_{BC})$ is identified thus: 1 m/sec$<(V_{AB} - V_{BC})<$3 m/sec. It should be noted that, via line 44, the raising of the barrier is already triggered at $t'_p$ (because 0 m/sec$<(V_{AB} - V_{BC})<$2 m/sec).

All contact closures ahead of 31', such as 31'', remain without effect because lines like the line 21' are not energized.

Conversely, when contactor 27 is closed before the instant $t'_p$ ($V_{BC}<V_{AB}$), the system is instantly disarmed (by the line 23).

Although it is essential to avoid the risk of arresting an aircraft under marginal conditions that is still able to take off (and therefore has, say, an acceleration of about 0.15g in the case of a twin-engined airplane running on one engine on the contrary any aircraft moving with zero or near-zero acceleration must be stopped at all costs. Such detection of zero acceleration is obtained by means of two successive measurements of the speed to within one meter per second (the basic performance), and is obtained completely reliably even in the event of the unlikely failure on the least reliable component. The ability to emit the command signal for automatic arresting of the aircraft is consequently not at the mercy of a failure in the equipment. In the same way, if an aircraft has sufficient acceleration, failure of the least reliable component must not lead to incorrect interpretation.

It may be noted therefore that each contact such as 31 simultaneously connects two main terminals (41, 22) and two auxiliary terminals (47, 48) to a safety circuit. Hence the contacts established (47, 48, 47' and 48' for example) on the paralleled lines 52, 53 emit the command signal on line 44 as soon as one of terminal 41 is energized in the event of failure of either of the latter lines or of one or the other of the auxiliary contacts.

The subject device of the invention will thus unfailingly operate even in the event of malfunctioning of a time-delay relay or of a command contact or of a command signal line.

The reference points A, B and C are separated by a distance 1 of 100 meters. The barrier 100 is placed 200 meters from reference point C and is raised in 1.5 seconds. The end 99 of the arresting section of the runway is 300 meters beyond barrier 100. Since the range of speeds monitored by the barrier control system is from 25 m/sec. to 100 m/sec., time-delay relays 9 and 29 are provided operation of which is staggered from one to the next to correspond to average speeds varying by 1 meter per second. The instant $t_p$ may be two seconds, for example. Clearly, settings different from the settings considered herein may be adopted.

In the case of application of this invention to a mechanism for automatically raising an arrester barrier, it will have been noted that disarming of the system is obtained in the event of an aircraft crossing the point C with an acceleration in excess of a chosen threshold value. It it is required to provide for the case of an aircraft taking off after it passes the point B, disarming may be assured also in the event of non-activation of one or both of two sensors C' and C'' positioned one-third and two-thirds of the way along BC for example activation of said sensors closing switches 101–102 which ensure electrical continuity of the command circuit.

It will be appreciated that the subject ground device of this invention for measuring the acceleration of a moving object accordingly comprises, in respect of a measurement base consisting of two equal and adjoining sections of the path along which the speed is to be measured, at least three primary switches which are operated in succession, the first at the start, the second halfway along and the third at the end of the distance to be covered (the second being possibly the embodiment formed by two simultaneously operating contactors), a first series of secondary switches operated by a time-delayed relays activated by the change of state of the first primary switch, a series of storage flip-flops, a second series of secondary switches operated by time-delayed relays activated by the change of state of the second primary switch, and a series of command signal emitting contacts.

The time delays in the first series of time-delayed relays are so stepped that upon operation of the second primary switch a classification of the average speed along the first section be effected instantly with a sufficient degree of precision by detecting the rank of the ultimate relay having changed state and simultaneously storing the information through the medium of the associated storage flip-flop.

The time delays of the second series of time-delayed relays are symmetrical and the electric circuit so devised that if, during the process of measuring the speed over the second section, the situation with respect to the second series of time-delayed relays should reveal a certain predetermined difference in relation to the previously "frozen" state of the storage flip-flops, a command signal be triggered by the contacts in the series of command-signal emitting contacts. The flip-flops are reset when the third primary switch operates.

It goes without saying that changes and substitutions may be made in the exemplary embodiment hereinbefore described: without departing from the scope of the invention as set forth in the appended claims.

I claim:

1. A ground device for measuring the acceleration of a moving object and operating a barrier upon signal from the ground device comprising at least three means for sensing the passage of the moving object past at least three reference points along a speed base, at least three primary switches, each respectively operated by one of said at least three sensing means, a series of bistable storage flip-flops, a first series of time-delayed relays operatively connected to said bistable storage flip-flops and to said primary switches connected to first and second ones of said reference points and adjusted to cause stepped triggering of at least some of said storage flip-flops to store a first classification of a first average speed of the moving object between first and second reference points, a second series of time-delayed relays operatively connected to said bistable storage flip-flops and to said primary switches connected to second and third ones of said reference points and adjusted to cause stepped triggering of at least some of said storage flip-flops to store a second classification of a second average speed of the moving object between second and third reference points, command signal control means operatively connected to said time-delayed relays to allow an output signal if the detection of a predetermined difference between said second and first average speeds occurs before the movement of the moving object past the third reference point resets said storage flip-flops into the neutral state, and command signal output means connected to said control means to operate the barrier.

2. The acceleration measuring device of claim 1, further characterized by said first series of time-delayed relays, each including classification contactor means for classifying said first average speed, said command signal control means including a plurality of command signal contactor means, all of said first series of time-delayed relays simultaneously excited by the passage of the moving object past the first reference point and opening each said classification contactor means successively in stepped relation, said primary switch connected to sensing means of the second reference point to allow current flow into all closed classification contactor means upon passage of the moving object past the second reference point, simultaneous closure of said storage flip-flops which are associated with said closed classification contactor means, and simultaneous excitation of said second series of time-delayed relays operatively connected to said command signal contactor means to successively connect each of said plurality of command signal contactor means in a stepped relation to lines energized through switching of said storage flip-flops.

3. The acceleration measuring device of claim 2, further characterized by said storage flip-flops each including contactors, said command signal contactor means being double contactors, each including a main contact and an auxiliary contact, said second series of time-delayed relays successively tripping to connect said storage flip-flop contactors through said command signal contactor means to said command signal output means, said command signal output means having lines parallel connected through said main contact and through said auxiliary contacts operated by said second series of time-delayed relays which have already tripped.

4. The acceleration measuring device of claim 2, further characterized by the reference points along the speed base being spaced 100 meters apart and said time-delayed relays set to operate at instants permitting speed identification to within one meter per second.

5. The acceleration measuring device of claim 1, further characterized by said command signal control means including a plurality of command signal contactor means connected in parallel for substitution of one for the other in the event of failure of any one.

* * * * *